US008606771B2

(12) United States Patent
Arasu et al.

(10) Patent No.: US 8,606,771 B2
(45) Date of Patent: Dec. 10, 2013

(54) EFFICIENT INDEXING OF ERROR TOLERANT SET CONTAINMENT

(75) Inventors: Arvind Arasu, Bothell, WA (US); Parag Agrawal, Stanford, CA (US); Kaushik Shriraghav, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 271 days.

(21) Appl. No.: 12/973,909

(22) Filed: Dec. 21, 2010

(65) Prior Publication Data

US 2012/0158696 A1 Jun. 21, 2012

(51) Int. Cl.
*G06F 7/00* (2006.01)
*G06F 17/30* (2006.01)

(52) U.S. Cl.
USPC ..... 707/713; 707/706; 707/736; 707/999.002

(58) Field of Classification Search
None
See application file for complete search history.

(56) References Cited

U.S. PATENT DOCUMENTS

| | | | |
|---|---|---|---|
| 6,263,334 B1 | 7/2001 | Fayyad et al. | |
| 7,054,867 B2 | 5/2006 | Bosley et al. | |
| 7,296,011 B2 | 11/2007 | Chaudhuri et al. | |
| 7,584,204 B2 | 9/2009 | Kapoor et al. | |
| 7,711,727 B2 | 5/2010 | Agrawal et al. | |
| 7,801,912 B2 | 9/2010 | Ransil et al. | |
| 7,979,413 B2* | 7/2011 | Krishnamurthy et al. | 707/706 |
| 2004/0260694 A1* | 12/2004 | Chaudhuri et al. | 707/5 |
| 2005/0165750 A1* | 7/2005 | Shakib et al. | 707/3 |
| 2005/0177345 A1* | 8/2005 | Okuno et al. | 702/187 |
| 2008/0195606 A1* | 8/2008 | Ren et al. | 707/5 |
| 2008/0281857 A1* | 11/2008 | Dymetman | 707/102 |
| 2008/0313128 A1 | 12/2008 | Arasu et al. | |
| 2009/0171945 A1* | 7/2009 | Li et al. | 707/5 |
| 2009/0210418 A1 | 8/2009 | Arasu et al. | |

OTHER PUBLICATIONS

Chaudhuri, et al., "Robust and Efficient Fuzzy Match for Online Data Cleaning", Retrieved at << http://tickett.net/dedupe/images/c/cb/Sig03_FM.pdf >>, International Conference on Management of Data and Symposium on Principles Database and Systems, Jun. 9-12, 2003, pp. 12.

Aggarwal, et al., "A New Method for Similarity Indexing of Market Basket Data", Retrieved at << http://www.charuaggarwal.net/sim.pdf >>, International Conference on Management of Data and Symposium on Principles of Database Systems, May 31-Jun. 3, 1999, pp. 12.

Aggarwal, et al., "Mining Association Rules Between Sets of Items in Large Databases", Retrieved at << http://staff.icar.cnr.it/manco/Teaching/2005/datamining/articoli/agrawal93mining.pdf >>, SIGMOD/PODS '93 Joint ACM SIGMOD, International Conference on Management of Data and ACM SIGMOD, May 25-28, 1993, pp. 10.

(Continued)

*Primary Examiner* — Azam Cheema
(74) *Attorney, Agent, or Firm* — International IP Law Group, PLLC

(57) ABSTRACT

The claimed subject matter provides a method and a system for the efficient indexing of error tolerant set containment. An exemplary method comprises obtaining a frequency threshold and a query set. All tokens or token sets within the query set are determined, and then all minimal infrequent tokens or all minimal infrequent tokens sets of data records are found and used to build an index. The minimal infrequent tokens or minimal infrequent tokensets are processed in a fixed order, and then a collection of signatures for each minimal infrequent token or token set is determined.

12 Claims, 7 Drawing Sheets

(56) References Cited

OTHER PUBLICATIONS

Aggarwal, et al., "Fast Algorithms for Mining Association Rules in Large Databases", Retrieved at << http://rakesh.agrawal-family.com/papers/vldb94apriori.pdf >>, in VLDB Proceedings of the 20th International Conference on Very Large Data Bases, 1994, pp. 13.

Arasu, et al., "Transformation-Based Framework for Record Matching", Retrieved at << http://research.microsoft.com/pubs/76150/icde08.pdf >>, IEEE 24th International Conference on Data Engineering, Apr. 7-12, 2008, pp. 10.

Arasu, et al., "Learning String Transformations From Examples", Retrieved at << http://citeseerx.ist.psu.edu/viewdoc/download?doi=10.1.1.151.7904&rep=rep1&type=pdf >>, Proceedings of the VLDB Endowment, vol. 2, No. 1, Aug. 2009, pp. 12.

Arasu, et al., "Efficient Exact Set-Similarity Joins", Retrieved at << http://www.vldb.org/conf/2006/p918-arasu.pdf >>, Proceedings of the 32nd International Conference on Very Large Data Bases, VLDB, Aug. 2006, pp. 918-929.

Baeza-Yates, et al., "Modern Information Retrieval", Retrieved at << http://elib.tu-darmstadt.de/tocs/127993029.pdf >>, 1999, pp. 9.

Broder, Andrei Z., "On the Resemblance and Containment of Documents", Retrieved at << http://www.cs.princeton.edu/courses/archive/spr05/cos598E/bib/broder97resemblance.pdf >>, In Compression and Complexity of Sequences, 1997, pp. 1-9.

Chaudhuri, et al., "Heavy-Tailed Distributions and Multi-Keyword Queries", Retrieved at << http://citeseerx.ist.psu.edu/viewdoc/download?doi=10.1.1.92.4296&rep=rep1&type=pdf >>, Proceedings of the 30th Annual International ACM SIGIR Conference on Research and Development in Information Retrieval, Jul. 23-27, 2007, pp. 8.

Chaudhuri, et al., "A Primitive Operator for Similarity Joins in Data Cleaning", Retrieved at << http://dc-pubs.dbs.uni-leipzig.de/files/Chaudhuri2006APrimitiveOperatorfor.pdf >>, Proceedings of the 22nd International Conference on Data Engineering, Apr. 3-7, 2006, pp. 12.

Chaudhuri, et al., "Mining Document Collections to Facilitate Accurate Approximate Entity Matching", Retrieved at << http://www.vldb.org/pvldb/2/vldb09-315.pdf >>, Proceedings of the VLDB Endowment, vol. 2, No. 1, Aug. 2009, pp. 12.

"Citeseer", Retrieved at << http://citeseerx.ist.psu.edu/ >>, Retrieved Date: Oct. 5, 2010, pp. 1.

Cohen, et al., "Summarizing Data using Bottom•K Sketches", Retrieved at << http://akpublic.research.att.com/~edith/Papers/bottomds.pdf >>, Proceedings of the Twenty-Sixth Annual ACM Symposium on Principles of Distributed Computing, PODC, Aug. 12-15, 2007, pp. 10.

Dean, Jeffrey., "Challenges in Building Large-Scale Information Retrieval Systems Invited Talk", Retrieved at <<http://wsdm2009.org/papers/p1-dean.pdf >>, Second ACM International Conference on Web Search and Web Data Mining, Feb. 9-11, 2009, pp. 1.

Elmagarmid, et al., "Duplicate Record Detection: A Survey", Retrieved at << http://pages.stern.nyu.edu/~panos/publications/tkde2007.pdf >>, IEEE Transactions on Knowledge and Data Engineering, vol. 19, No. 1, Jan. 2007, pp. 1-16.

Gionis, et al., "Similarity Search in High Dimensions via Hashing", Retrieved at << http://www.cs.princeton.edu/courses/archive/spr06/cos592/bib/LSH-VLDB-gionis99.pdf >>, Proceedings of 25th International Conference on Very Large Data Bases, Sep. 7-10, 1999, pp. 518-529.

Goethals, et al., "Advances in Frequent Itemset Mining Implementations: Report on FIMI'03", Retrieved at << http://www.sigkdd.org/explorations/issues/6-1-2004-06/goethals.pdf >>, ACM SIGKDD Explorations Newsletter—Special issue on learning from imbalanced datasets, vol. 6, No. 1, Jun. 2004, pp. 109-117.

Gravano, et al., "Approximate String Joins in a Database (Almost) for Free", Retrieved at << http://citeseerx.ist.psu.edu/viewdoc/download?doi=10.1.1.29.3727&rep=rep1&type=pdf >>, 27th International Conference on Very Large Data Bases, Sep. 11-14, 2001, pp. 10.

Gunopulos, et al., "Discovering All Most Specific Sentences", Retrieved at << http://reference.kfupm.edu.sa/content/d/i/discovering_all_most_specific_sentences_92265.pdf >>, ACM Transactions on Database Systems (TODS), vol. 28, No. 2, Jun. 2003, pp. 140-174.

Hadjieleftheriou, et al., "Fast Indexes and Algorithms for Set Similarity Selection Queries", Retrieved at << http://www2.research.att.com/~marioh/papers/icde08-1.pdf >>, Proceedings of the International Conference on Data Engineering (ICDE), Apr. 2008, pp. 10.

Hadjieleftheriou, et al., "Efficient Approximate Search on String Collections", Retrieved at << http://www.ics.uci.edu/~chenli/pub/vldb09-tutorial.pdf >>, Proceedings of the VLDB Endowment, vol. 2, No. 2, Aug. 2009, pp. 2.

Ji, et al., "Efficient Interactive Fuzzy Keyword Search", Retrieved at << http://citeseerx.ist.psu.edu/viewdoc/download?doi=10.1.1.163.6369&rep=rep1&type=pdf >>, The 18th International World Wide Web Conference, Apr. 20-24, 2009, pp. 371-380.

Koudas, et al., "Record Linkage: Similarity Measures and Algorithms", Retrieved at << http://citeseerx.ist.psu.edu/viewdoc/download?doi=10.1.1.157.7472&rep=rep1&type=pdf >>, International Conference on Management of Data and Symposium on Principles Database and Systems, Jun. 27-29, 2006, pp. 127.

Li, et al., "Efficient Type-Ahead Search on Relational Data: a Tastier Approach", Retrieved at << http://www.ics.uci.edu/~chenli/pub/sigmod2009-tastier.pdf >>, International Conference on Management of Data Providence, Jun. 29-Jul. 2, 2009, pp. 12.

Mamoulis, Nikos., "Efficient Processing of Joins on Set-Valued Attributes", Retrieved at << http://wis.cs.ucla.edu/Publications/papers/r06p02.pdf<<, International Conference on Management of Data and Symposium on Principles Database and Systems, Jun. 9-12, 2003, pp. 157-168.

Melnik, et al., "Adaptive Algorithms for Set Containment Joins", Retrieved at << http://infolab.stanford.edu/~melnik/pub/melnik_TODS03.pdf >>, ACM Transactions on Database Systems, vol. 28, No. 2, 2003, pp. 1-38.

Minton, et al., "A Heterogeneous Field Matching Method for Record Linkage", Retrieved at << http://citeseerx.ist.psu.edu/viewdoc/download?doi=10.1.1.64.1520&rep=rep1&type=pdf >>, Fifth IEEE International Conference on Data Mining, Nov. 27-30, pp. 8.

Nakamura, et al., "What Sperner Family Concept Class is Easy to Be Enumerated?", Retrieved at << http://ieeexplore.ieee.org/stamp/"stamp.jsp?tp=&arnumber=4781143 >>, Proceedings of the 8th IEEE International Conference on Data Mining, Dec. 15-19, 2008, pp. 482-491.

Ramasamy, et al., "Set Containment Joins: The Good, The Bad and The Ugly", Retrieved at << http://www.vldb.org/conf/2000/P351.pdf >>, Very Large Data Bases, Sep. 10-14, 2000, pp. 351-362.

Sarawagi, et al., "Efficient Set Joins on Similarity Predicates", Retrieved at << http://www-2.cs.cmu.edu/~natassa/courses/15-721/resources/set_join.pdf >>, International Conference on Management of Data and Symposium on Principles Database and Systems, Jun. 13-18, 2004, pp. 12.

Xiao, et al., "Top-K Set Similarity Joins", Retrieved at << http://www.cse.unsw.edu.au/~lxue/paper/icde09_chuan.pdf >>, Proceedings of the 25th International Conference on Data Engineering, Mar. 29-Apr. 2, 2009, pp. 12.

\* cited by examiner

| ID | Organization Name |
|---|---|
| 1 | Madison Garden |
| 2 | Olive Garden Italian Restaurant, Madison WI 53701 |
| 3 | Pizza Hut, Milwaukee WI |
| ... | ... |

EFFICIENT INDEXING OF ERROR TOLERANT SET CONTAINMENT

BACKGROUND

Set based comparisons may be useful primitives for supporting a wide variety of similarity functions in textual record matching. Various techniques have been proposed to improve the performance of set similarity lookups. These techniques focus almost exclusively on symmetric notions of set similarity. However, asymmetric notions of set similarity may provide a useful tool for indexing string sets, an important component of textual record matching.

Examples of asymmetric measures of set similarity may include the use of Jaccard containment. Jaccard containment alone may not be an efficient measure of similarity for longer textual strings, however string transformations allow the Jaccard containment to effectively measure similarity for longer strings. String transformations may also provide a programmable level of error in an input query set. Additionally, a well-organized data structure, such as an inverted index, may provide greater efficiency for look ups based on an input query set.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a method and a system for the efficient indexing of error tolerant set containment. An exemplary method comprises obtaining a frequency threshold and a query set. All tokens or token sets within the query set are determined, and then all minimal infrequent tokens or all minimal infrequent tokens sets of data records are found and used to build an index. The minimal infrequent tokens or minimal infrequent tokensets are processed in a fixed order, and then a collection of signatures for each minimal infrequent token or tokenset is determined.

An exemplary system the efficiently indexes an error tolerant set containment. One exemplary system comprises a processing unit and a system memory. The memory system, which comprises a computer-readable storage medium, stores code configured to direct the processing unit to obtain a frequency threshold and a query set. Also stored in the system memory is code to direct the processing unit to determine all tokens or token sets within the query set, and then find all minimal infrequent tokens or all minimal infrequent tokens sets of data records and use the minimal infrequent tokens or all minimal infrequent tokens sets to build an index. Code stored in the system memory may also be configured to cause the processing unit to process the minimal infrequent tokens or minimal infrequent token sets in a fixed order, and then determine a collection of signatures for each minimal infrequent token or token set.

Another exemplary embodiment of the subject innovation provides one or more computer-readable storage media that includes code to direct the operation of a processing unit. The code may direct the processing unit to efficiently index an error tolerant set containment. The computer-readable storage media may comprise code that could direct a processing unit to obtain a frequency threshold and a query set. The computer-readable storage media may also comprise code to direct the processing unit to determine all tokens or token sets within the query set, and then find all minimal infrequent tokens or all minimal infrequent tokens sets of data records and use the minimal infrequent tokens or all minimal infrequent tokens sets to build an index. Code stored on the computer-readable storage media may also be configured to cause the processing unit to process the minimal infrequent tokens or minimal infrequent token sets in a fixed order, and then determine a collection of signatures for each minimal infrequent token or token set.

The following description and the annexed drawings set forth in detail certain illustrative aspects of the claimed subject matter. These aspects are indicative, however, of but a few of the various ways in which the principles of the innovation may be employed, and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 1 is a diagram showing a reference relation containing various strings;

DETAILED DESCRIPTION

Figure 2:
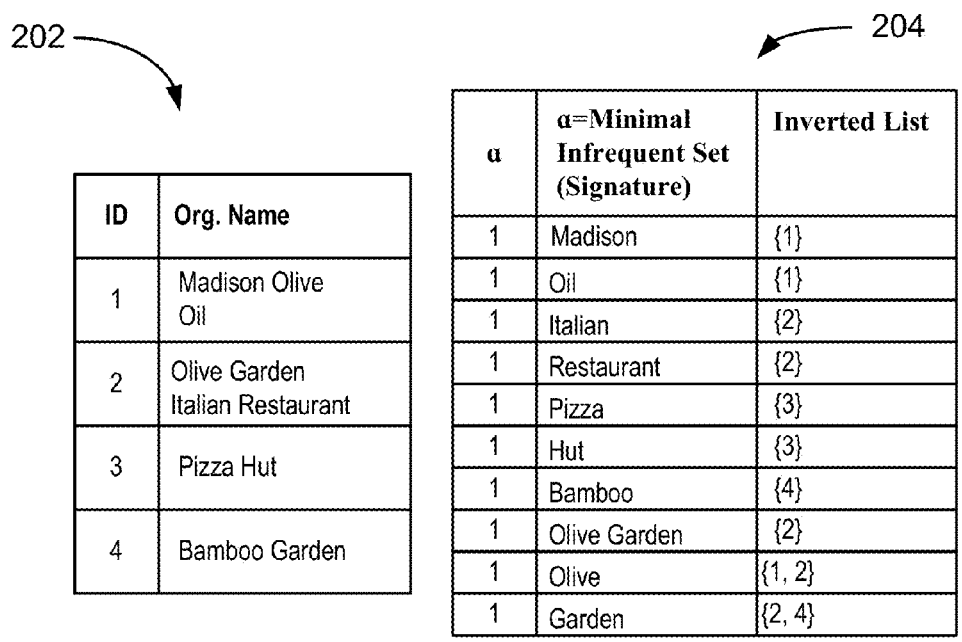
FIG. 2 is a diagram showing an organizational table and signatures.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "tenant," "database," and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media, such as a computer-readable storage media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for electrical or electronic signals and the like.

Those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

1 Introduction

The subject innovation relates to a method and a system for the efficient indexing of error tolerant set containment. Efficient indexing of error tolerant set containment is useful in calculating similarity functions, which may be a function that measures textual similarity. Similarity functions may use indexing to measure textual similarity. Various indexing techniques may be used to support data cleaning in the context of similarity functions. Data cleaning is an essential in measuring textual similarity. For example, due to various errors in data, a customer name in a sales record may not be an exact match of the name referring to the same customer as registered in the warehouse. This data would need to be "cleaned" before textual similarity can be measured and record matching can be performed.

Thus, a critical component of record matching may involve the determination of similarity between two strings. A sting may encompass various amounts of text. String similarity is typically captured using a similarity function that measures textual similarity. There are multiple measures of textual similarity which may be used as similairty functions, such as edit distance, Jaccard similarity, Jaro-Winkler distance, and Hamming distance. Each measure of textual similarity may be best suited for a partiular scenario. In order to apply a particular string similarity function $f$ for record matching, efficient similarity lookups may need to be performed.

When given an input string s, the goal of a similarity lookup may be to find all strings r in a reference relation R such that $f(r, s) > \theta$ for a given threshold $0 \leq \theta \leq 1$. Accordingly, specific indexing methods have been proposed to accomplish an efficient similarity function $f$. However, these indexing methods may require a data cleaning platform to implement and maintain a large suite of indexing techniques in order to support a variety of similarity functions. A data cleaning platform is a general purpose system that can be customized for data cleaning in any specific domain, such as addresses, products, or citations. Requiring a data cleaning platform to implement and maintain a large suite of indexing techniques is both impractical and inefficient for the data cleaning platform.

In order to support a variety of similarity functions, set similarity lookups have been identified as a primitive operation that may be used for supporting lookups based on several similarity functions. The set similarity lookups may include modeling a string as a set of tokens. For example, it has been observed that edit distance, as a measure of textual similarity, can be indexed by building an index over the set of q-grams of a string. The q-grams of a string may be defined as a substring of letters, q letters in length. This observation has led to a body of work focused on efficient techniques to perform lookups and joins based on set similarity. Most of these techniques center on one specific form of set similarity, namely the Jaccard Coefficient, which measures the ratio of the size of the intersection to the size of the union. The Jaccard Coefficient is well known in the art. For example, the Jaccard Coefficient between the sets {Olive, Garden} and {Olive, Tree} is ⅓. The Jaccard Coefficient is found by setting the numerator to the number of matching words among the sets, and setting the denominator to the total number of different words. A high Jaccard Coefficient denotes a higher similarity between sets.

As noted herein, the Jaccard Coefficient is only one type of similarity function in the class of set-based similarity functions. Specifically, the Jaccard Coefficient is a symmetric function. A function $f(r, s)$ is symmetric if $f(r, s) = f(s, r)$. As a symmetric function, the Jaccard Coefficient does not depend on which string is r and which is s. There are scenarios where an asymmetric notion of set-based similarity is more appropriate. Referring now to FIG. 1, chart 100 shows a reference relation containing various stings. The chart is divided into two columns, containing fields for a record identifier label 102 and an organization name label 104. The chart 100 contains string 106 as "Madison Garden" corresponding to record identifier 112. The chart 100 also contains string 108 "Olive Garden Italian Restaurant, Madison Wis. 53701" corresponding to record identifier 114. Finally, the chart 100 contains string 110 as "Pizza Hut, Milwakee Wis." corresponding to record identifier 116.

Suppose that the strings 106, 108, and 110 are converted into sets by treating each space-delimited word as a token. Further suppose that there is a query to lookup the string "Olive Garden" from the chart 100. The string 106 "Madison Garden" has Jaccard Coefficient of ⅓, whereas the string 108 "Olive Garden Italian Restaurant, Madison Wis. 53701" has Jaccard Coefficient of 2/7. The Jaccard Coefficient of string 106 is greater than the Jaccard Coefficient of string 108 in this case. However, string 108 intuitively constitutes a better match than string 106. In this example, the Jaccard Coefficient penalizes string 108 for its longer length, even though it contains all the tokens in the query string "Olive Garden". This is noted as a deficiency with the Jaccard Coefficient.

One technique used to deal with this deficiency is to assign to each token a weight that varies inversely with word frequency. However, this simply mitigates the string length deficiency associated with the Jaccard Coefficient and does not eliminate it. In order to eliminate the string length problem associated with the Jaccard Coefficient, asymmetric notions of set-based similarity have been proposed, specifically, the Jaccard Containment. The Jaccard Containment of a query set in a reference set is the ratio of the weighted size of the intersection of the two sets to the weighted size of the query set. Instead of requiring all tokens in the query to match, Jaccard Containment requires only a fraction of the tokens to be present within the string. For example, if the Jaccard Containment is ½, this denotes only half of the tokens between the query set and reference relation must match. The Jaccard Containment of the string "Olive Garden" with respect to string 106 of FIG. 1 is ½, whereas the Jaccard Containment with respect to string 108 of FIG. 1 is 1. The Jaccard Containment is a generalization of exact set containment which has been studied extensively and is well known in the art.

Jaccard Containment has several applications such as error tolerant lookups. Error tolerant lookups do not need to be an exact match; this type of lookup allows for some degree of error. Error-tolerant lookups are important in online applications and are used for matching user queries against addresses (as in map services) and products (as in a products search). Since regular keyword searches are typically based on set containment, Jaccard Containment offers a natural error tolerant alternative. Jaccard Containment is error tolerant compared to pure set containment because it does not require all tokens in the input query string to be present in a matching record; in other words, it allows some input tokens to be erroneous. Further, Jaccard Containment may also be applicable in performing fuzzy autocompletion. In fuzzy autocompletion, matches from an underlying reference relation must be identified as the query string is being typed.

In the previous discussion of FIG. 1, textual similarity was used to match strings. However, textual similarity alone may be inadequate in matching strings that are completely syntactically different, yet still represent the same real-world object. For example, the first name Robert can be written as Bob, and United States of America can be abbreviated to USA. The concept of string transformations may be used to overcome this inadequacy. String transformations are well known in the art. Combining explicitly provided string transformations of the form "USA→United States of America" along with a core similarity function like Jaccard Containment forms a programmable similarity function that is influenced by the input set of transformations. Under the programmable similarity function, string transformations may be used to generate "derived" strings from a single (query or data) string. For example, the string "Olive Garden Madison Wis. USA" can derive the string "Olive Garden Madison Wis. USA" under the transformation "WI→Wisconsin". Queries may be logically executed as though each of the derived queries is run over all strings derived from the reference relation.

1.1 Strings as Sets

In the determination of textual similarity, it may be useful to model strings as sets. In general, the subject innovation may be applicable regardless of how strings are converted to sets. For ease of explanation, strings are modeled as a set of delimited tokens. The delimiters include white spaces and punctuation symbols. For example, the string "Olive Garden" represents the set {Olive, Garden}. The term "strings" may be used to denote the sets, while elements of the sets may be referred to as "tokens." Weights may be associated with tokens, and these weights are well known in the art. For instance, the inverse document frequency may be used to associate a higher weight with rare tokens and a lower weight with frequent tokens such as stop words. The inverse document frequency is a particular well known technique of assigning weights to tokens that is inversely proportional to the frequency of the token. More formally, if a token t occurs in K records and there is a total of N records, then the inverse document of t is log(N/K). Additionally, stop words are words such as "a", "an", and "the" that can often be removed without changing the intent of the query. Assume that the sets are weighted, where every token e in the universe has a positive integral weight wt(e). The weight of a set s, denoted wt(s) is the sum of the weights of its tokens.

1.2 Jaccard Containment

Given two sets $s_1$ and $s_2$, the Jaccard Containment of $s_1$ in $s_2$, denoted JaccCont($s_1$, $s_2$) is defined as $$\frac{wt(s_1 \cap s_2)}{wt(s_1)}.$$

For example, consider the sets $s_1$=Olive Garden and $s_2$=Madison Olive. Suppose that all tokens have unit weight. Then JaccCont($s_1$, $s_2$)=½. Note that Jaccard Containment is an asymmetric similarity function that generalizes exact set containment such that if $s_1 \subseteq s_2$, then JaccCont($s_1$, $s_2$)=1.

1.3 String Transformations

String transformations such as "Bob→Robert" are used to enhance the similarity between strings that are textually far apart. For ease of explaination, transformations are of the form "lhs→rhs" are used, where each of lhs and rhs is a single token. Examples of such transformations are "IL→Illinois", "Grdn→Garden", "St→Street" and "J→Jeffrey". However, the techniques of the subject innovation may be used in more general transformations.

The set of transformations may be provided as part of the input, either explicitly in a table or generated by a program. For instance, while a transformation like "Bob→Robert" may be provided explicitly, transformations that expand abbreviations such as "J→Jeffrey" and transformations that account for token-level edit errors such as "Masachusets→Massachusetts" may be generated programmatically.

When there is a transformation "e→e'", it is said that token e derives e'. The set of all tokens derived by e is called the set of derivations of e, denoted $\bar{e}$. A set s derives the set s', denoted "s⇒s'" when s' can be obtained by starting with s and replacing some subset of its tokens $e_1, \ldots, e_k$ respectively with tokens $e_1, \ldots, e_{k'}$ such that "$e_i \rightarrow e_i$'". The set of derivations of a set s, denoted $\bar{s}$ is the collection of all sets derived by s. Consider the set of transformations "Drive→Dr" and "IL→Illinois". The collection of sets derived by "Main Drive Chicago Ill." is {Main Drive Chicago Ill., Main Dr Chicago Ill., Main Drive Chicago Ill., Main Dr Chicago Ill.}. The number of derivations of s, |s̄| can be large. If every token of s derives two other tokens, then $|\bar{s}|=3^{|s|}$.

1.5 Jaccard Containment without String Tranformations

A method for addressing Jaccard containment without transformations is a technique known as prefix filtering and is well known in the art. Consider a total ordering over all tokens in the universe. Given a weighted set r and $0 \leq \beta \leq 1$, define prefix$_\beta$(r) as follows: sort the elements in r by the global token ordering and find the shortest prefix such that the sum of the weights of the tokens in the prefix exceeds β·wt(r). This definition results in the following assumption: If JaccCont($s_1$, $s_2$)≥θ then prefix$_{1-\theta}$($s_1$)∩$s_2 \neq \phi$.

For example, suppose all elements have unit weights. If the Jaccard Containment of the set "Olive Garden Restaurant" in set s is at least 0.6, then s must contain either Olive or Garden, based on the order in which the set is listed. This insight can be used to develop an indexing scheme and lookup algorithm that are explained in the Prefix Filtering (No Transformations) Algorithm. A high level view or pseudo-code of an algorithm that may be used to implement the Prefix Filtering (No Transformations) Algorithm is presented below:

| Prefix Filtering (No Transformations) |
| --- |
| 1: Create Index |
|     Build token lists over reference relation R. |
| 2: Lookup Algorithm for threshold θ |
|     (1) Given query set q, compute $\text{prefix}_{1-\theta}(q)$. |
|     (2) For each set $r \in \cup_{sig \in prefix_{1-\theta}(q)} \text{List}(sig)$ |
|     (3) If (JaccCont(q, r) ≥ θ) then output r. |

The index used consists of standard token lists. Given a query set q and lookup threshold θ, the union of the lists corresponding to tokens in $\text{prefix}_{1-\theta}(q)$ is computed. For each record contained in the union, JaccCont(q, r)≥θ is verified. If the token weights are obtained from their inverse document frequency, then ordering them in descending order by weight to compute the prefix filter may tend to access smaller lists.

The main limitation of prefix filtering is that the presence of long lists can substantially degrade lookup time. Long lists are known to adversely affect the performance of even exact containment lookups where efficient algorithms for performing list intersection can be used to potentially skip over long lists. When performing the union of lists, skipping is no longer an option. As a result, long lists pose a serious challenge in indexing Jaccard containment without transformations.

Additionally, it is not clear how to efficiently adapt prefix filtering in the presence of string transformations. The semantics of transformations suggests the Basic Prefix Filtering with Transformations Algorithm. A high level view or pseudo-code of an algorithm that may be used to implement the Basic Prefix Filtering with Transformations Algorithm is presented below:

| Basic Prefix Filtering with Transformations |
| --- |
| 1: Create Index |
|     Build token lists over the sets in R. |
| 2: Lookup Algorithm for threshold θ |
|     Given query set q, run the Prefix Filtering (No Transformations) |
|     Algorithm over each of the sets in $\bar{q}$ and union the results. |

The index structure is identical for each case when transformations are applied only on the query. Given a query set q, run the Prefix Filtering (No Transformations) Algorithm for each set derived by q. Since the number of sets derived by q can be large as discussed herein, the Basic Prefix Filtering with Transformations Algorithm can be highly inefficient.

1.5 Jaccard Containment With Transformations

Alternatively, a set of string transformations together with Jaccard Containment can be used to define a programmable similarity function as follows: given a set of transformations T, the Jaccard Containment of set $s_1$ in set $s_2$ under T, denoted $\text{JaccCont}_T(s_1, s_2)$ is defined to be the maximum containment JaccCont($s_1'$, $s_2$) among all $s_1'$ derived by $s_1$ using T. Consider the sets $s_1$=Olive Grdn and $s_2$=Olive Garden. The containment of $s_1$ in $s_2$ is ½. However, in the presence of the transformation "Grdn→Garden", the containment of $s_1$ in $s_2$ becomes 1. The definition of a programmable similarity function can be modified to allow transformations to be applied to both $s_1$ and $s_2$ and, in general, to allow different sets of transformations to be applied to $s_1$ and $s_2$. For example, when a query set is being looked up against a reference relation, programmatically generated transformations such as token-edits and expansions of abbreviations, can be applied only on the query set while applying transformations that capture synonyms such as "Bob→Robert" can be applied on both the query and the reference sets. For ease of explanation and unless otherwise stated, assume that the transformations T are applied only on the query and not on the reference relation. Additionally, weights may be associated with transformations and there may be an overall similarity function that reflects these weights. However, note that the subject innovation can use multiple transformations on multiple sets coupled with various weights associated with the transformations.

2 Indexing Problem & Lookup Problem

Given a reference relation R consisting of sets and a set of transformations T, and given an input query set q, the Jaccard Containment lookup problem seeks all reference sets r∈R such that $\text{JaccCont}_T(q, r) \geq \theta$ for a specified similarity threshold θ. The subject innovation employs an index structure and a query-time algorithm using said index structure to efficiently solve the Jaccard Containment lookup problem. The main data structure used for indexing is the inverted list. Inverted lists are built for both single tokens and as well as token sets.

If an inverted list is buit on a token set, then the token set has been indexed. A token set that has been indexed is called a signature. The list corresponding to a signature sig, denoted List(sig) contains the record identifiers of all records in the reference relation R that contain the signature. Standard token-level inverted lists are referred to as token lists. Inverted lists may store only the record identifiers, but are referred to as though they contain the actual records themselves. Given a query set q, a signature sig is said to cover q if sig ⊆ q. If q is an exact containment query, then List(sig) is a superset of the result of q.

Token sets, in general, are referred to as tokensets. Records in the reference relation which are a special case of tokensets are referred to as records. The input query and signatures are also tokensets and are referred to as query and signature, respectively. There are collections of tokensets, such as the reference relation itself and sets of signatures. The term set is used when it is clear from the context of the sentence which sets are being referred to. The cardinality of any set s is denoted as |s|.

3 Index 3.1 Minimal Infrequent Tokensets

Signatures are created for queries whose output size is small while the inverted lists for individual terms are large. The rationale is that these are the queries for which the benefit of materialization is high. This intuition is formalized by using the notion of minimal infrequent tokensets. The index may include a frequency threshold a as an input parameter. Let R be the reference relation being indexed. The frequency of a tokenset s, freq(s) is defined as the number of records in R that contain s. A tokenset s is said to be a-frequent if freq(s)>a. If freq(s)≤a, then s is called a-infrequent. Tokenset s is said to be a-minimal infrequent if it is a-infrequent whereas every proper subset s' ⊂ s is a-frequent.

When the frequency of a query set q is discussed, it refers to a mean freq(q), not to be confused with the popularity of q. When the frequency threshold a is clear from the context, the reference to a is dropped. The collection of all a-minimal infrequent tokensets is referred to as the a-infrequent border of R.

Referring now to FIG. 2, a diagram 200 is shown containing an organizational table and signatures. In diagram 200 index 202 shows a collection R. Suppose that a=1. Then the tokensets Olive and Garden are frequent. The tokenset Olive Garden is minimal infrequent whereas Olive Garden Restaurant is infrequent but not minimal infrequent.

3.2 Exact Lookup For a-Infrequent Queries

Any a-infrequent tokenset must contain an a-minimal infrequent subset (possibly itself). Suppose that all non-empty a-minimal infrequent tokensets are indexed. Any exact containment query q which is a-infrequent is covered by some a-minimal infrequent signature sig. In order to answer q, it suffices to verify for each record r in List(sig) whether $q \subseteq r$. Since $|List(sig)| \leq a$, it follows that if all non-empty a-minimal infrequent tokensets are indexed, then any a-infrequent query can be answered by fetching at most a records. This result quantifies the goal of having an output-sensitive lookup performance and motivates a standard inverted index.

The question arises how to find the a-minimal infrequent signature that covers the given a-infrequent query q. The a-minimal infrequent signature that covers the given a-infrequent query q can be found time linear in |q| as follows. First, process the tokens of q in a fixed order. A fixed order are may be an alphabetical order of tokens, weight order of tokens, or a length order of tokens. Keep a token e if dropping it makes the resulting tokenset a-frequent. Otherwise, drop e. A high level view or pseudo-code of an algorithm that may be used to find the a-minimal infrequent signature that covers the given a-infrequent query q is presented below:

---
Linear Time Algorithm to Find a Covering Signature

Input:  An a-infrequent set q;
Output: An a-minimal infrequent (signature) set contained in q
Let sig ← q
For each token e ∈ q in the fixed order
    If sig − e is a-infrequent
        sig ← sig − e
Return sig

---

In order to implement the Linear Time Algorithm to Find a Covering Signature, a frequency oracle is maintained that stores the set of all a-frequent tokensets with their frequencies. The frequency oracle can be used to check whether a given tokenset is a-frequent. Note that the tokenset returned by the Linear Time Algorithm to Find a Covering Signature is a-infrequent and dropping any single element from the tokenset makes it a-frequent. Thus, given an a-infrequent query q, the Linear Time Algorithm to Find a Covering Signature finds an a-minimal infrequent covering signature in time linear in |q|.

Consider the chart 202 showing collection R in FIG. 2. Suppose that a=1 and the query is "Olive Garden Restaurant". Suppose that the Linear Time Algorithm to Find a Covering Signature processes the tokens in reverse lexicographical order. First consider dropping "Restaurant". The remaining set "Olive Garden" is a-infrequent so "Restaurant" is dropped. Dropping "Garden" would result in "Olive" which is a-frequent so "Garden" is not dropped. Similarly, "Olive" is not dropped. The result of processing the tokens with the Linear Time Algorithm to Find a Covering Signature in reverse lexicographical order is the minimal-infrequent tokenset "Olive Garden".

3.3 Series of Parameters

In general, both a-infrequent queries and also a-frequent queries are used. The main observation in handling frequent queries is that any a-frequent tokenset is minimal-infrequent for some frequency threshold a'. Therefore, the frequency may be partitioned space using a geometrically increasing series of parameters a, 2a, 4a, ..., |R|=N. The multiplicative factor 2 in the geometrically increasing series of parameter may be another input parameter c. For ease of description, the input parameter used is 2. Minimal infrequent sets are indexed in the final index with respect to each of these parameters. In this final index, any query set q is infrequent with respect to at least some $2^i \cdot a$. Thus, the a $2^i \cdot a$-minimal-infrequent set contained in q may be used to answer the exact containment query q.

Referring again to FIG. 2, example relation 204 and its corresponding index 202 for the series with a=1 are displayed. In general, a signature can be minimal-infrequent for more than one value in the parameter series. In this case, the list is stored just once. Thus, in FIG. 2, there are no signatures corresponding to parameter value 4 since those signatures are subsumed by the smaller parameter values. The minimal infrequent sets for the parameter value 4 are the single tokens, reflected by corresponding index 202 having four rows. Note each token has been indexed for smaller values of the parameter, as shown in corresponding index 202. Observe that when a=N=|R|, the minimal infrequent sets are exactly the single tokens. Thus, the index described above generalizes a standard token-level inverted index.

3.4 Exact Lookup For a-Frequent Queries

Given the index defined in FIG. 2, the Linear Time Algorithm to Find a Covering Signature may be applied to answer exact containment queries q that are a-frequent, with the additional step of finding the smallest i such that q is $(2^i \cdot a)$-infrequent. The frequency oracle is used to check for a given tokenset and a given value of j whether it is $(2^j \cdot a)$-frequent. The Linear Time Algorithm to Find a Covering Signature is then ran to find a $(2^i \cdot a)$-minimal infrequent signature sig. Note that time taken to compute sig is linear in |q|. Each record in List(sig) is then compared to see if it contains q. This yields the following result: An exact containment query q with output size o can be answered by processing at most max(a, 2·o) reference records. Thus, the index yields an output-sensitive guarantee for exact containment queries. This guarantee illustrates the benefits of indexing minimal-infrequent tokensets.

3.5 Index Construction

The notion of minimal infrequent sets is closely related to the notion of maximal frequent item sets. Efficient algorithms to compute frequent item sets have been extensively studied. Any of these algorithms may be adapted to efficiently compute both the frequency oracle as well a standard inverted index. The computation of the minimal infrequent sets with respect to the parameter settings 2a, 4a, ... can be piggy-backed over the computation of the a-minimal-infrequent sets. This process is well known in the art.

3.6 Index Size

In the worse case, the number of minimal-infrequent sets is exponential in the record size. However, the index size is expected to be much smaller in practice for many reasons. First, the notion of minimal infrequent sets is closely related to the data mining notion of maximal frequent item sets. Extensive work has shown both analytically and empirically that the number of maximal frequent item sets in a database is unlikely to be exponential in the record size. Based on this intuition, there are algorithms to compute the set of maximal frequent item sets that are widely accepted as practical. A similar intuition applies to minimal infrequent sets. Along the lines of prior work on frequent item set mining, the index size may be characterized by using the concept of the Vapnik Chervonenkis (VC) Dimension. If a collection of sets R is drawn from domain D, a set $s \subset D$ is said to be shattered by R if the collection $\{s \cap r : r \in R\}$ is the power-set of s. The VC-Dimension of R is the size of the largest set that can be shattered.

Consider the collection R={$r_1$=Pizza Hut, $r_2$=Madison Olive, $r_3$=Bamboo Garden, $r_4$=Olive Garden Italian American Restaurant}. The set s=Olive Garden is shattered by R since it is contained in $r_4$, and Olive may be obtained by intersecting s with $r_2$, Garden by intersection s with $r_3$ and $\phi$ by intersecting s with $r_1$. No set of size 3 can be shattered by R. Thus, its VC-dimension is 2. Intuitively, a larger VC-dimension indicates a larger degree of correlation among the tokens. As a result, for reference relation R, consider the collection $C_a(R)$ consisting of all a-minimal infrequent sets and all a-frequent sets. Both the index construction time as well as the index size are worst-case exponential in the VC-Dimension of $C_a(R)$. This result means that the index size is correlated with the degree of inter-token correlation. Prior empirical work has shown that the VC-dimension of various real life data sets is small.

While the VC-dimension provides an upper bound on the worst case of the index size, the index size could potentially be impractical even when the VC-dimension is small. For instance, suppose that for a database with average set size 10, the VC-dimension is 7. It is possible that a large fraction of size 7 sets get indexed. The number of such sets could be as large as $10_7$=120 times the cardinality of the relation. As a result, it is necessary to understand how many minimal infrequent sets there could be among all token sets of size d.

Consider a relation R consisting of N sets each of size l, generated independently and uniformly at random from a domain of size D. The expected number of a-minimal infrequent sets of size d+1 is at most $$D \times \frac{(Nl^d)^a}{D^{(a-1)d}} \left(\frac{e}{\alpha}\right)^\alpha.$$

Here, e refers to the base of the natural logarithm. Suppose that $N=10^7$ and $l=10$ with $D=10^6$. Then, the expected number of sets of size 3 that are minimal infrequent for a=100 is at most $$10^6 \times \frac{10^{1100}}{10^{99*12}} \left(\frac{e}{100}\right)^{100} \ll 1.$$

This result assumes uniformity and independence, both of which are unlikely to hold in real-life data. However, the above analysis does support the notion that the worst case behavior of the index size is unlikely to arise in practice. Note that the index is parameterized and the parameter can be used to control its size. As a special case, when a=N, the index is reduced to token-lists.

3.7 Generalization

Despite the analysis presented above, additional methods are necessary to control the index size should any of the above assumptions be violated. For example, even though the standard inverted index is not designed for large document corpora, it would be useful to have methods that can realize the index for such a scenario.

The idea of minimal infrequent sets can be generalized as follows. Define a property P over sets to be monotonic if whenever set s satisfies P, every subset of s also satisfies P. The predicate freq(s)>a is an example of a monotonic predicate. For a relation R, a tokenset s belongs to the negative border with respect to a monotonic predicate P if s fails to satisfy P but every proper subset of s does. Note that the negative border with respect to the predicate freq(s)>a is exactly the collection of a-minimal infrequent sets.

Therefore, inverted lists may be built for tokensets that lie on the negative border of alternate monotonic predicates. The index construction algorithm as well as the lookup algorithm are applicable for the negative border of any monotonic predicate. While the predicate freq(s)>a is useful for indexing as as discussed herein, index size may be controled using alternate monotonic predicates. There are two methods for controlling index size using alternate monotonic predicates. First. the cardinality of sets being indexed via the monotonic predicate freq(s)>a^|s|≤l may be restricted. This ensures that sets above size l will not be considered for indexing. Second, the frequency freq(s) does not have to be measured over the reference relation. For instance, the frequency of a set in a relation may be obtained by considering the q-grams of the strings instead of the entire strings. This does not affect correctness since the predicate freq(s)>a is monotonic no matter which relation the frequency is measured over. However, it significantly impacts the index size since the record sizes in the q-gram relation are no larger than q. At the same time, performance benefits are targeted for queries that are contained within a window of size q of the reference records.

These two methods are by no means exhaustive. As noted herein, so long as the predicate is monotonic, the lookup algorithms are guaranteed to be correct. A combination of the above methods may be used to control the index size.

3.8 Index Updates

When a new record r is added to (or deleted from) the reference relation, its record identifier may be added (or deleted) to all sets in Signatures(r̄), like a standard inverted index. This method of maintaining the index does not modify the negative border but still guarantees correctness of the maintained index structure. One can think of the maintained index as being based on a monotonic predicate freq'(s)>a where the incrementally added records are not considered in computing freq'. This incrementally maintained index may degrade in performance as lots of additional records are added. To regain performance guarantees, the frequency negative border may be periodically refreshed by splitting sets that go from infrequent to frequent due to the added records.

Figure 3:
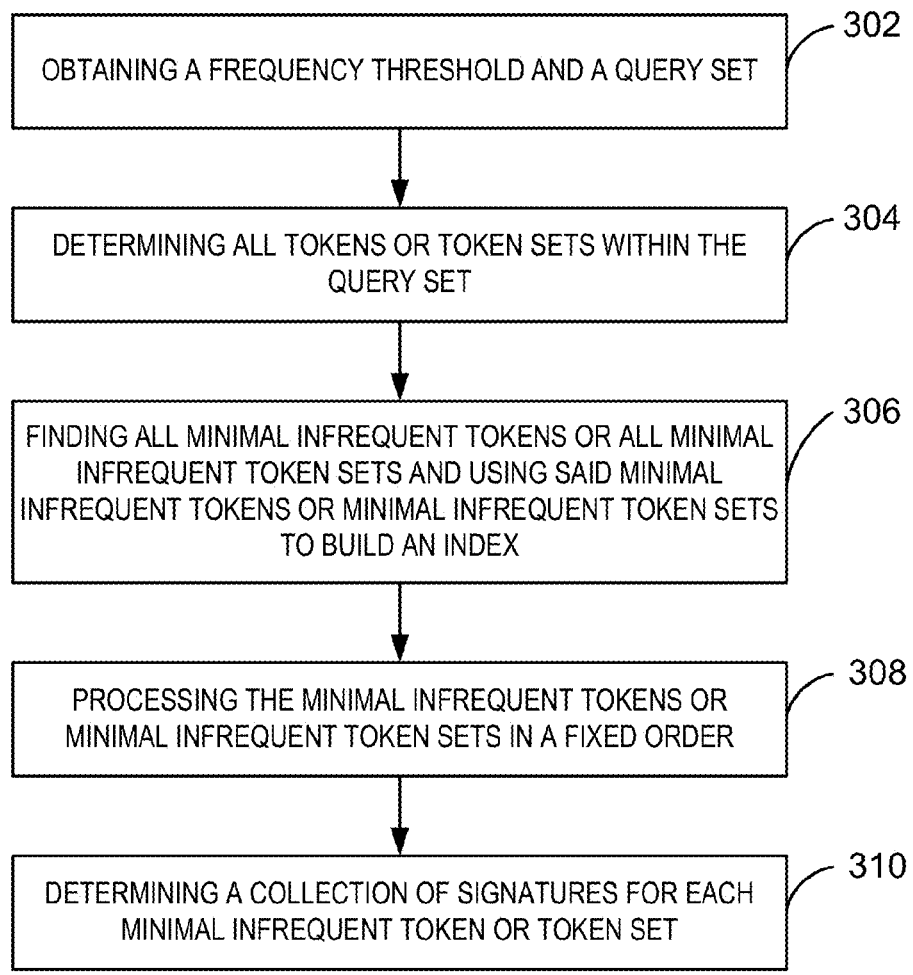
FIG. 3 is a process flow diagram of a method for efficient indexing of error tolerant set containment in accordance with the subject innovation.

Referring now to FIG. 3, flowchart 300 is a process flow diagram of a method for efficient indexing of error tolerant set containment in accordance with the subject innovation. At block 302, a frequency threshold a and a query set are obtained. At block 304, all tokens and token sets within the query set are determined. Additionally, a property P may be defined over the sets to be monotonic if whenever set s satisfies P, every subset of s also satisfies P.

At block 306, all minimal infrequent tokens or all minimal infrequent tokensets are found and used to build an index. At block 308, the tokens and tokensets are processed in a fixed order. At block 310, a collection of signatures is determined for each minimal infrequent token or tokenset. Determining a collection of signatures may encompass keeping a token within a particular tokenset if dropping the token makes the resulting tokenset a-infrequent. Otherwise, the token is dropped. The tokensets may be further refined by defining a tokenset s or a relation R that belongs to a negative border with respect to a monotonic predicate P if s fails to satisfy P but every proper subset of s does.

4 Jaccard Containment Lookup With Transformations 4.1 Query Variants

An error-tolerant set containment query can be thought of as representing a collection of exact containment queries. For example, suppose a Jaccard Containment lookup without transformations is performed where the query set is q and the lookup threshold is θ. Define the collection of minimal subsets of q whose weight is greater than or equal to θ. wt(q) as the Jaccard variants of q, denoted JaccardVariants$_θ$(q). The lookup can be executed by finding all Jaccard variants of q, issuing an exact containment query corresponding to each of these variants and taking the union of the results. Consider the query q=Olive Garden Restaurant. Suppose that the weights of the elements are 7, 2 and 1 respectively. If the query threshold is θ=0.8, then answering q is equivalent to answering the exact containment queries Olive Garden and Olive Restaurant and taking the union of their results. This observation generalizes even in the presence of transformations. Consider the query q=Olive Grdn Restaurant where the weights of the elements are 7, 2 and 1 respectively. Suppose that there is a transformation "Grdn→Garden" and the weight of Garden is also 2. If the query threshold is θ=0.8, then q is equivalent to the union of the exact containment queries Olive Grdn, Olive Garden and Olive Restaurant. This observation is formalized by introducing the notion of variants of a query.

Given a query set q and a lookup threshold θ, variants of a query are defined as Variants$_θ$(q)=$\cup_{q \Rightarrow q'}$ JaccardVariants$_θ$ (q'). Recall that q⇒q' is used to denote that q' can be derived from q by applying transformations. Also observe that when the threshold θ=1, then the variants of q are exactly the sets derived from q via transformations. Further, note that Jacc-Cont$_T$(q, r)>θ if and only if there is some q$_{var}$∈Variants$_θ$(q) such that q$_{var}$⊆r. Therefore, q can be answered by issuing an exact containment query for each q$_{var}$∈Variants$_θ$(q) and taking a union of the results. The main issue with issuing a separate exact containment query per q$_{var}$∈Variants$_θ$(q) is that it fails to account for the fact that a single signature can cover multiple variants, and hence potentially accesses many lists redundantly. Consider the query q=Olive Grdn Restaurant as discussed herein. The signature Olive covers all the variants Olive Grdn, Olive Garden and Olive Restaurant.

4.2 Covering Framework

In general, a collection of signatures that covers all variants is desired. This observation suggests an optimization problem. This optimization problem can be defined as follows: Given a set q, Signatures(q) is defined as the collection of subsets of q that are indexed. Exactly those subsets of q that are minimal infrequent for some index parameter a. $2^i$ are included. Also define Signatures($\bar{q}$)=$\cup_{q \Rightarrow q'}$ Signatures(q'). Note that Signatures($\bar{q}$) can be computed using the frequency oracle by using algorithms to compute minimal infrequent item sets, similar to the index build algorithm described herein. Further, A subset of C⊆Signatures($\bar{q}$) is defined as a variant-covering if each variant in Variants$_θ$(q) is covered by some signature in C. For instance, consider the previous example where the query q=Olive Garden Restaurant, the weights of the elements are 7, 2 and 1 respectively, and the query threshold is θ=0.8. In this example, the signature Olive is a variant-covering. A high level view or pseudo-code of an algorithm that employs a lookup framework based on the notion of variant-covering is presented below:

---
Covering Based Lookup Framework

Input: Query set q and lookup threshold θ.
Output: All records r ∈ R such that JaccCont$_T$(q,r) ≥ θ
    Find the matching transformations for q
    Find C ⊆ Signatures($\bar{q}$) that is a variant-covering of q
    For each record r ∈$\cup_{sig∈C}$ List(sig)
        If (JaccCont$_T$(q,r) ≥ θ)
        Output r
---

In the Covering Based Lookup Framework, the idea is to first find a variant-covering of the query, access the corresponding lists and verify for each of the retrieved records whether the similarity threshold is satisfied. In general, there are multiple variant coverings. For a given covering C, the number of record identifiers retrieved in Step 3 of the Covering Based Lookup Framework is the size of the union of the inverted lists corresponding to the signatures in C. The goal is to find a covering such that this number is minimized. The sum of the list sizes is used as a proxy for the size of the union. The cost of a covering C is defined as the sum of the sizes of the lists corresponding to signatures in C. Among all variant-coverings of q, finding the one with least cost is defined as covering optimization.

Figure 4:
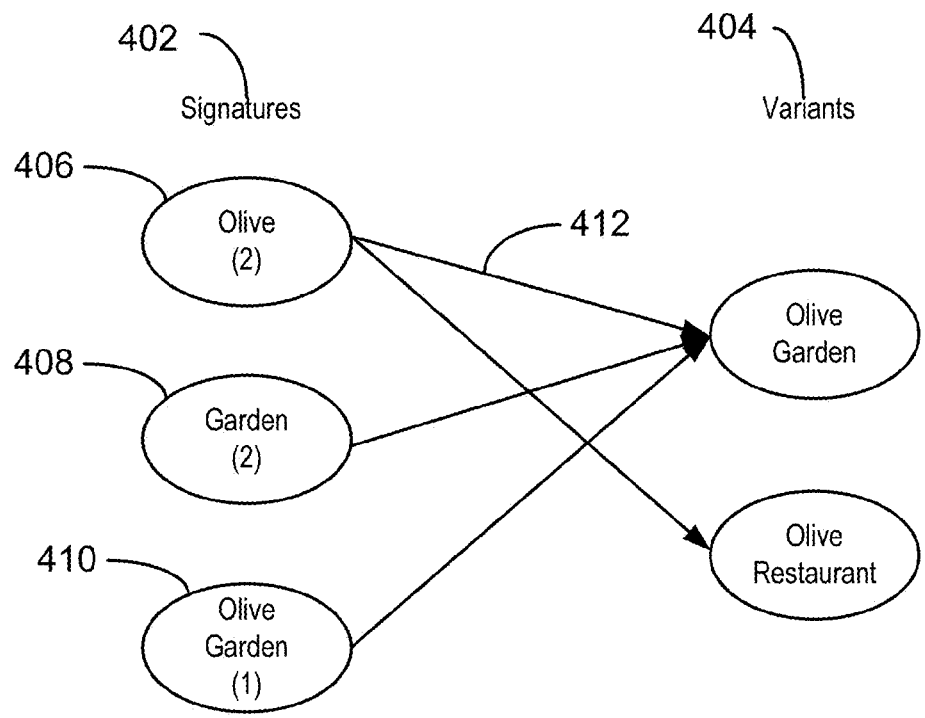
FIG. 4 is a diagram showing an exemplary covering optimization problem.

This optimization problem is modeled as a bipartite graph where there are signatures of the query on the one side and the query variants on the other. An edge connects a signature to a variant if the signature covers the variant. A variant-covering is a subset of signatures such that all variants are incident to them. The goal is to find a minimum cost variant-covering. Referring now to FIG. 4, a diagram 400 is shown that illustrates the covering optimization problem. Diagram 400 is a bipartite graph shown for minimum cost variant covering. The graph corresponds to the example where the query q=Olive Garden Restaurant, the weights of the elements are 7, 2 and 1 respectively, and the query threshold is θ=0.8. There are signatures 402 and variants 404. The numbers in the parentheses of the signature sets 406, 408, and 410 indicate the lengths of the lists associated with the respective signature sets. The edges 412 of the bipartite graph represents the fact that a specific signature covers a specific variant. There are two solutions to finding a minimum cost variant covering: the set cover approach and the hitting set approach.

4.2.1 Set Cover Approach

The covering optimization problem is closely related to the set cover problem where variants must be covered using signatures with a minimum cost. As a result, the well-known greedy approximation algorithm may be used to solve the covering problem. A high level view or pseudo-code of an algorithm that employs a Greedy Algorithm to Solve Covering Optimization is presented below:

---
Greedy Algorithm to Solve Covering Optimization: Set Cover Approach

Input: Query set q and lookup threshold θ
Output: C ⊆ Signatures ($\bar{q}$) that is a variant-covering of a q
1:    C ← φ
2:    While (there is an variant uncovered by C)
3:    Pick the signature with maximum benefit-cost ratio
    (Benefit of signature sig = number of variants uncovered by C
    but covered by sig) (Cost of sig = /List(sig) /)
4:    C ← C ∪ sig
---

In the Greedy Algorithm to Solve Covering Optimization, all variants Variants$_θ$(q) and all signatures Signatures($\bar{q}$) are computed explicitly, then signatures are added in the order of their benefit-to-cost ratio. The benefit of a signature is the number of variants the signature covers, while the cost corresponds to the length of its corresponding list.

Consider the Covering Based Lookup Framework coupled with the method sketched in the Greedy Algorithm to Solve Covering Optimization to find the covering has formal output-sensitive guarantee for an "ideal" index that indexes all tokensets. Cost of the optimal covering over this hypothetical index is denoted as Cost$_{Truemin}$. This cost represents the minimum cost required to answer the query under our Covering Based Lookup Framework. Suppose that the cost of the solution returned by the Greedy Algorithm to Solve Covering Optimization is $Cost_{Greedy}$. This results in $Cost_{Greedy} \leq COSt_{TrueMin} \times \max(a, 2) \times O(\lg|Variants_\theta(q)|)$ for a query q and lookup threshold θ.

The factor max(a, 2) arises because all tokensets are not materialized, while $O(\lg|Variants_\theta(q)|)$ arises due to the greedy approximation to set cover that is used. Observe that the upper bound yielded by the previous result is a function of a. Even though this result is unlikely for typical values of a like a=100, it is a worse case scenario. The actual gap from $Cost_{Truemin}$ is likely to be smaller in practice.

The main limitation of the Greedy Algorithm to Solve Covering Optimization is that it computes the covering by explicitly enumerating all signatures and all variants. As observed herein, a query may have a large number of variants and signatures if a lot of transformations match the query. In such cases, computing the covering using the Greedy Algorithm to Solve Covering Optimization becomes prohibitively expensive. Thus, even though the cover returned by the set cover approach may contain few signatures and have a low cost, the cost paid in computing the Greedy Algorithm to Solve Covering Optimization may be significant. An alternate algorithm that generates a covering without requiring an enumeration of all variants of q may be better suited to solve the covering optmization problem.

4.2.2 Hitting Set Approach

As a preliminary matter, in the context of a query q, there is a universe of tokens, namely the set of all tokens in $\bar{q}$. These tokens encompass all tokens in q and all tokens on the right hand side of transformations that match q. This universe may be used to define the complement of a variant which includes all tokens from the universe that are not in the variant. The complement of variant $q_{var}$ is referred to as $\tilde{q}_{var}$. It follows that if a signature does not cover a variant, then the complement of the variant intersects hits the signature. In other words it is a "hitting set" of the signature. This argument can be generalized as follows: a variant $q_{var} \in Variants_\theta(q)$ is not covered by a collection of signatures if and only if its complement $\tilde{q}_{var}$ hits each signature in the collection.

Consider the query Olive Garden Italian Restaurant 53701. Suppose that all tokens have weight 1, there are no transformations, and the containment threshold is 0.5. The variant Italian Restaurant 53701 is not covered by the collection of signatures {Olive Italian, Garden Restaurant}. However, the complement of the above variant is Olive Garden, which hits both the signatures in the collection.

Further suppose there is a collection of signatures. Based on the fact that if a signature does not cover a variant then the complement of the variant intersects hits the signature, all variants of q are covered by first enumerating all minimal hitting sets of the signature collection, and then for each minimal hitting set, checking if its complement contains a variant. Consider again the query Olive Garden Italian Restaurant 53701, with all tokens having weight 1, no transformations, and a containment threshold of 0.5. Note that Olive Garden is a hitting set for the signature collection {Olive Italian, Garden Restaurant}. Its complement contains Italian Restaurant 53701, a variant of the query. If the complement of some hitting set contains a variant, a signature is to the collection added that covers this variant using the Linear Time Algorithm to Find a Covering Signature, and proceed.

Consider adding a signature Italian 53701 that covers the variant Italian Restaurant 53701 in the previous case. The lookup algorithm based on this addition of a signature is found in the Hitting Set for Covering Optimization and can be implemented using the Linear Time Algorithm to Find a Covering Signature. A high level view or pseudo-code of an algorithm that employs a Hitting Set Algorithm for Covering Optimiztion is presented below:

| Hitting Set Algorithm for Covering Optimiztion |
|---|
| Input: Query set q and lookup threshold θ |
| Output: C ⊆ Signatures ($\bar{q}$) that is a variant-covering of q |
| 1:     Let C denote the current covering. C ← φ. |
| 2:     Let Hit(C) denote the minimal hitting sets of C.<br>       Hit(C) ← {φ} |
| 3:     $\overline{Hit}$(C) ← complements of sets in Hit(C) |
| 4:     If no $\bar{h} \in \overline{Hit}$(C) contains a variant, stop and return C |
| 5:     Else find an uncovered variant and a signature sig that covers it |
| 6:     Add sig to C. |
| 7:     Compute Hit(C) and go to step 3 |

Note that the Hitting Set Algorithm for Covering Optimization does not need to compute all variants and signatures for the query like the Set Cover Approach. Instead, the time required in computing the variant-covering is dependent on the number of signatures in the covering. Hence, in cases where the number of signatures in the variant-covering is small relative to the total number of signatures and variants for the query, the Hitting Set Algorithm for Covering Optimiztion is likely to outperform the set cover algorithm in terms of the time required to compute the covering. However, the Hitting Set Algorithm for Covering Optimiztion is known to be a hard problem, and as a result the worst case bound for this algorithm is not polynomial.

Although the Hitting Set Algorithm for Covering Optimiztion is heuristic in terms of the cost of the covering that it computes, it it can be adapted to reflect the benefit-cost ratio order in which the Set Cover Approach proceeds. In order to provide a higher preference to signatures that cover more variants, the tokens are ordered in increasing order of their weight in Step 5 of the Hitting Set Algorithm for Covering Optimiztion before running the linear algorithm.

4.3 Implication for Prefix Filtering

In the absence of transformations and when there is only have token-inverted lists, the Hitting Set Algorithm for Covering Optimiztion reduces to prefix filtering. Thus, the Hitting Set Algorithm for Covering Optimiztion yields a generalization of prefix filtering to handle transformations. Additionally, that the problem of finding the hitting set of a collection of singleton signatures is trivial—there is only one hitting set, namely the union of the singletons. Thus, the complexity of Algorithm the Hitting Set Algorithm for Covering Optimiztion is polynomial in the number of elements in all sets in $\bar{q}$. In contrast, the Set Cover Approach requires enumeration of all sets in $Variants_\theta(q)$.

4.3.1 Computing Similarity Score

Step 4 in the Covering Based Lookup Framework checks whether $JaccCont_r(q,r) \geq \theta$. For ease of explanation, transformations have been applied only on the query. When applying transformations only on the query, verifying $JaccCont_r(q,r) \geq \theta$ is trivial. All techniques presented thus far can be extended in a straightforward manner to also handle transformations applied on the reference relation. However, verifying $JaccCont_r(q,r) \geq \theta$ becomes challenging. When transformations are applied on the reference relation, the definition of $JaccCont_r$ requires consideration of all sets in $\bar{q}$ and $\bar{r}$.

The problem of verifying $JaccCont_r(q,r) \geq \theta$ may be reduced to the problem of finding the maximum matching in a weighted bipartite graph. For two tokensets $s_1$ and $s_2$, $JaccCont(s_1,s_2) \geq \theta \Leftrightarrow wt(s_1 \cap s_2)(1-\theta) + wt(s_1-s_2)(-\theta) \geq 0$. Based on this observation, a bipartite graph may be constructed with nodes corresponding to tokens of q on one side, nodes corresponding to the tokens of r on the other side, and add an edge between a node corresponding to tokens $e_1 \in q$ and $e_2 \in r$ if either of the following is true: (1) if $e_1 = e_2$, with corresponding weight $wt(e_1)$; (2) if $e_1 \to e_2$ with weight $wt(e_2)$ or vice versa, or (3) if there is some $e_3$ with $e_1 \to e_3$ and $e_2 \to e_3$, the edge weight here is $wt(e_3)$. Generally, an edge may be added between two nodes through more than one of the above ways. In this case, the maximum weight is assigned to the edge.

A new set of "mirror" nodes is added to the side corresponding to r. This accounts for nodes in q that are unmatched. Hence, there is one mirror node for each node in q. For token $e_1 \in q$ let minwt denote the minimum weight among all tokens derived by $e_1$. An edge is added that connects $e_1 \in q$ to its minor node with weight $minwt \times (-\theta)$. Since the algorithm for weighted bipartite matching assumes that weights are positive, all edge weights are made positive by adding a suitably large number M.

Figure 5:
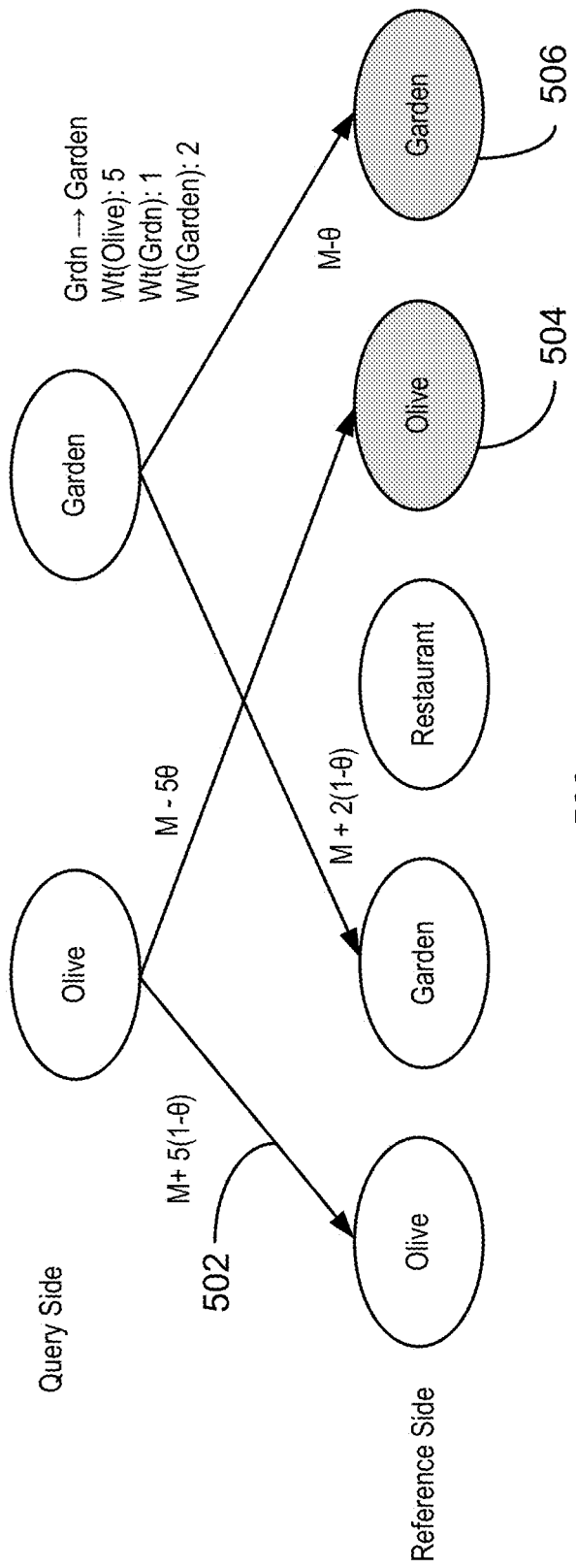
FIG. 5 is a diagram showing a reduction to weighted bipartite matching.

Referring now to FIG. 5, a diagram 500 illustrates the reduction to weighted bipartite matching. The bipartite graph is constructed for the pair q=Olive Grdn and r=Olive Garden is displayed. The token weights and relevant transformations are shown in FIG. 5. For example, edge 502 has weight $M=5(1-\theta)$. The shaded nodes 504 and 506 indicate the mirror nodes. The weight of the maximum matching in the weighted bipartite graph in FIG. 4 is at least $M|q|$ if and only if Jacc-$Cont_\tau(q, r) \geq \theta$.

Figure 6:
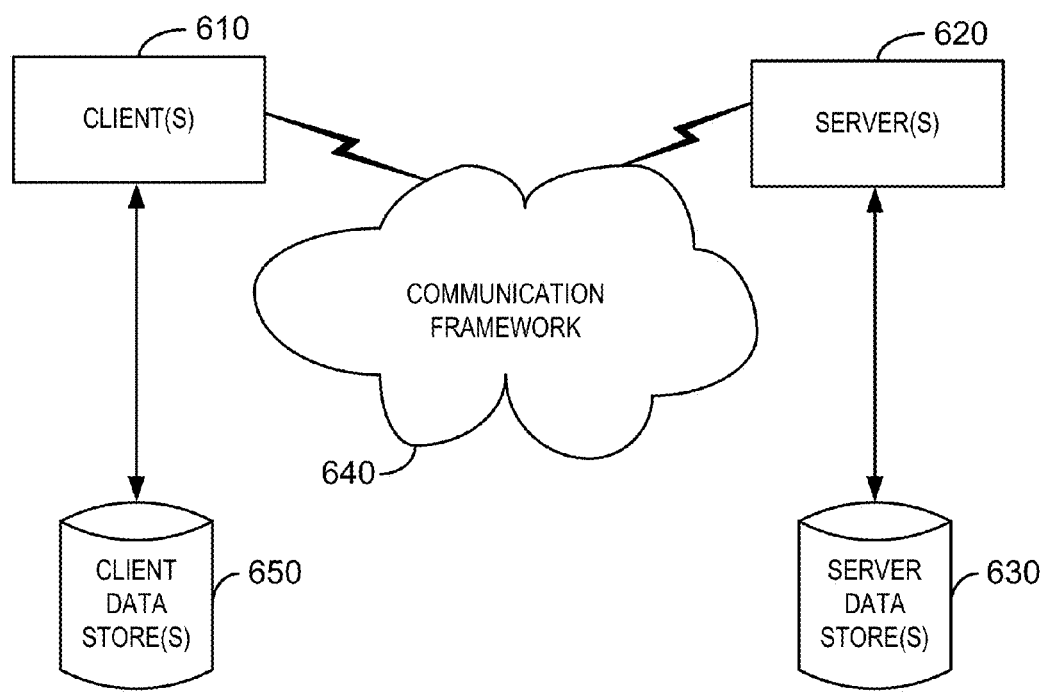
FIG. 6 is a block diagram of an exemplary networking environment wherein aspects of the claimed subject matter can be employed.
Figure 7:
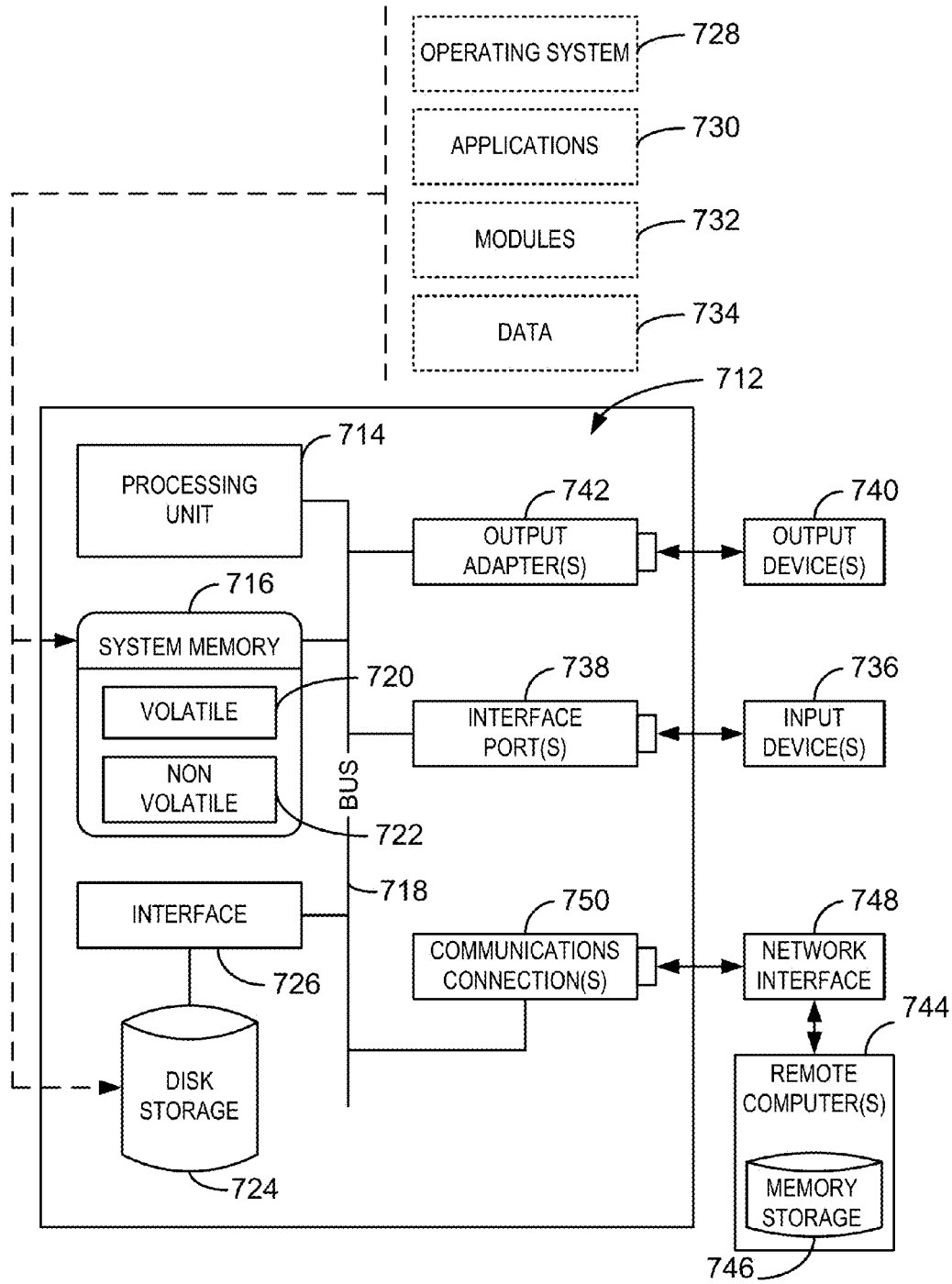
FIG. 7 is a block diagram of an exemplary operating environment that can be employed in accordance with the subject innovation.

In order to provide additional context for implementing various aspects of the claimed subject matter, FIGS. 6-7 and the following discussion are intended to provide a brief, general description of a suitable computing environment in which the various aspects of the subject innovation may be implemented. For example, solutions to the Indexing Problem and Lookup Problem, as described herein, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 6 is a schematic block diagram of a sample-computing system 600 with which the claimed subject matter can interact. The system 600 includes one or more client(s) 610. The client(s) 610 can be hardware and/or software (e.g., threads, processes, computing devices). The system 600 also includes one or more server(s) 620. The server(s) 620 can be hardware and/or software (e.g., threads, processes, computing devices). The server(s) 620 may host the indexing services as discussed herein.

One possible communication between a client 610 and a server 620 can be in the form of query sets adapted to be transmitted between two or more computer processes. The system 600 includes a communication framework 640 that can be employed to facilitate communications between the client(s) 610 and the server(s) 620. The client(s) 610 are operably connected to one or more client data store(s) 650 that can be employed to store information local to the client(s) 610. The client data store(s) 650 do not have to be in the client(s) 610, but may be located remotely, such as in a cloud server. Similarly, the server(s) 620 are operably connected to one or more server data store(s) 630 that can be employed to store information local to the servers 620.

As an example, the client(s) 610 may be computers providing access to software services over a communication framework 640, such as the Internet. The server(s) 620 may be able to monitor software services accessed by the client.

With reference to FIG. 7, an exemplary environment 700 for implementing various aspects of the claimed subject matter includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures known to those of ordinary skill in the art.

The system memory 716 may comprise non-transitory computer-readable storage media that includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable programmable ROM (EEPROM), or flash memory.

Volatile memory 720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 712 also includes other non-transitory computer-readable media, such as removable/non-removable, volatile/non-volatile computer storage media. FIG. 7 shows, for example a disk storage 724. Disk storage 724 includes, but is not limited to, devices like a magnetic disk drive, floppy disk drive, tape drive, Jaz drive, Zip drive, LS-100 drive, flash memory card, or memory stick.

In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in the suitable operating environment 700. Such software includes an operating system 728. Operating system 728, which can be stored on disk storage 724, acts to control and allocate resources of the computer system 712.

System applications 730 take advantage of the management of resources by operating system 728 through program modules 732 and program data 734 stored either in system memory 716 or on disk storage 724. It is to be appreciated that the claimed subject matter can be implemented with various operating systems or combinations of operating systems.

A user enters commands or information into the computer 712 through input device(s) 736. Input devices 736 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 736 connect to the processing unit 714 through the system bus 718 via interface port(s) 738. Interface port(s) 738 include, for example, a serial port, a parallel port, a game port, and a universal serial bus (USB).

Output device(s) 740 use some of the same type of ports as input device(s) 736. Thus, for example, a USB port may be used to provide input to the computer 712, and to output information from computer 712 to an output device 740.

Output adapter 742 is provided to illustrate that there are some output devices 740 like monitors, speakers, and printers, among other output devices 740, which are accessible via adapters. The output adapters 742 include, by way of illustration and not limitation, video and sound cards that provide a means of connection between the output device 740 and the system bus 718. It can be noted that other devices and/or systems of devices provide both input and output capabilities such as remote computer(s) 744.

The computer 712 can be a server hosting databases containing multiple indexed reference relations using logical connections to one or more remote computers, such as remote computer(s) 744. The remote computer(s) 744 may be client systems configured with web browsers, PC applications, mobile phone applications, and the like, to allow users to access the database services, as discussed herein. The remote computer(s) 744 can be a personal computer, a server, a router, a network PC, a workstation, a microprocessor based appliance, a mobile phone, a peer device or other common network node and the like, and typically includes many or all of the elements described relative to the computer 712. For purposes of brevity, only a memory storage device 746 is illustrated with remote computer(s) 744. Remote computer(s) 744 is logically connected to the computer 712 through a network interface 748 and then physically connected via a communication connection 750.

Network interface 748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to the computer 712. The hardware/software for connection to the network interface 748 may include, for exemplary purposes only, internal and external technologies such as, mobile phone switches, modems including regular telephone grade modems, cable modems and DSL modems, ISDN adapters, and Ethernet cards.

An exemplary embodiment of the computer 712 may comprise a server hosting databases containing multiple indexed reference relations. An exemplary processing unit 714 for the server may be a computing cluster comprising Intel® Xeon CPUs. The disk storage 724 may comprise an enterprise data storage system, for example, holding thousands of user pages. Exemplary embodiments of the subject innovation may provide indexing services stored on multiple databases as described herein.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A method for efficient indexing of error tolerant set containment, comprising:
   obtaining a frequency threshold and a query set;
   determining all tokens or token sets within the query set;
   finding all minimal infrequent tokens or all minimal infrequent tokensets of data records and using said minimal infrequent tokens or minimal infrequent tokens sets to build an index;
   processing the minimal infrequent tokens or minimal infrequent tokensets in a fixed order;
   determining a collection of signatures for each minimal infrequent token or token set, the collection of signatures covering all variants of the query set;
   finding a complement of signatures that do not cover variants of the query set;
   adding the complement of signatures to the collection of signatures if the complement of signatures intersects a current collection of signatures;
   finding a signature of an uncovered variant of the query set; and
   adding the signature of the uncovered variant of the query set to the collection of signatures, wherein the collection of signatures covers all variants of the query set.

2. The method recited in claim 1, wherein an index size associated with each signature of the collection of signatures is controlled.

3. The method recited in claim 1, wherein a weighted Jaccard Containment lookup with String Transformations is performed.

4. The method recited in claim 1, wherein a programmable similarity function determines a level of error.

5. A system for automatic allocation of tenants to database services, the system comprising:
   a processing unit; and
   a system memory, wherein the system memory comprises code configured to direct the processing unit to:
     obtain a frequency threshold and a query set;
     determine all tokens or token sets within the query set;
     find all minimal infrequent tokens or all minimal infrequent tokens sets of data records and use said minimal infrequent tokens or minimal infrequent tokens sets to build an index;
     process the minimal infrequent tokens or minimal infrequent tokensets in a fixed order;
     determine a collection of signatures for each minimal infrequent token or token set, the collection of signatures covering all variants of the query set, wherein signatures based on variants of the query set are added to the collection of signatures in order of a benefit to cost ratio.

6. The system recited in claim 5, wherein the collection of signatures covers all variants of the query set.

7. The system recited in claim 6, comprising:
   finding a complement of signatures that do not cover the variants of the query set;
   adding the complement of signatures to the collection of signatures if the complement of signatures intersects a current collection of signatures;
   finding a signature of an uncovered variant of the query set; and
   adding the signature of the uncovered variant of the query set to the collection of signatures.

8. The system recited in claim 5, wherein an index size associated with each signature of the collection of signatures is controlled.

9. The system recited in claim 5, wherein a weighted Jaccard Containment lookup with String Transformations is performed.

10. The system recited in claim 5, wherein a programmable similarity function determines a level of error.

11. A method for efficient indexing of error tolerant set containment, comprising:
    obtaining a frequency threshold and a query set;
    determining all tokens or token sets within the query set;
    finding all minimal infrequent tokens or all minimal infrequent tokens sets of data records and using said minimal infrequent tokens or minimal infrequent tokens sets to build an index;
    processing the minimal infrequent tokens or minimal infrequent token sets in a fixed order; and
    determining a collection of signatures for each minimal infrequent token or token set, the collection of signatures covering all variants of the query set, wherein signatures based on variants of the query set are added to the collection of signatures in order of a benefit to cost ratio.

12. A system for automatic allocation of tenants to database services, the system comprising:
    a processing unit; and
    a system memory, wherein the system memory comprises code configured to direct the processing unit to:
      obtain a frequency threshold and a query set;
      determine all tokens or token sets within the query set;
      find all minimal infrequent tokens or all minimal infrequent tokens sets of data records and use said minimal infrequent tokens or minimal infrequent tokens sets to build an index;
      process the minimal infrequent tokens or minimal infrequent tokensets in a fixed order;
    determine a collection of signatures for each minimal infrequent token or token set, the collection of signatures covering all variants of the query set;
      finding a complement of signatures that do not cover variants of the query set;
      adding the complement of signatures to the collection of signatures if the complement of signatures intersects a current collection of signatures;
      finding a signature of an uncovered variant of the query set; and
      adding the signature of the uncovered variant of the query set to the collection of signatures.

* * * * *